Oct. 31, 1939.                  C. D. STEWART                    2,177,960
                                BRAKE MECHANISM
                              Filed Dec. 28, 1938              3 Sheets-Sheet 2
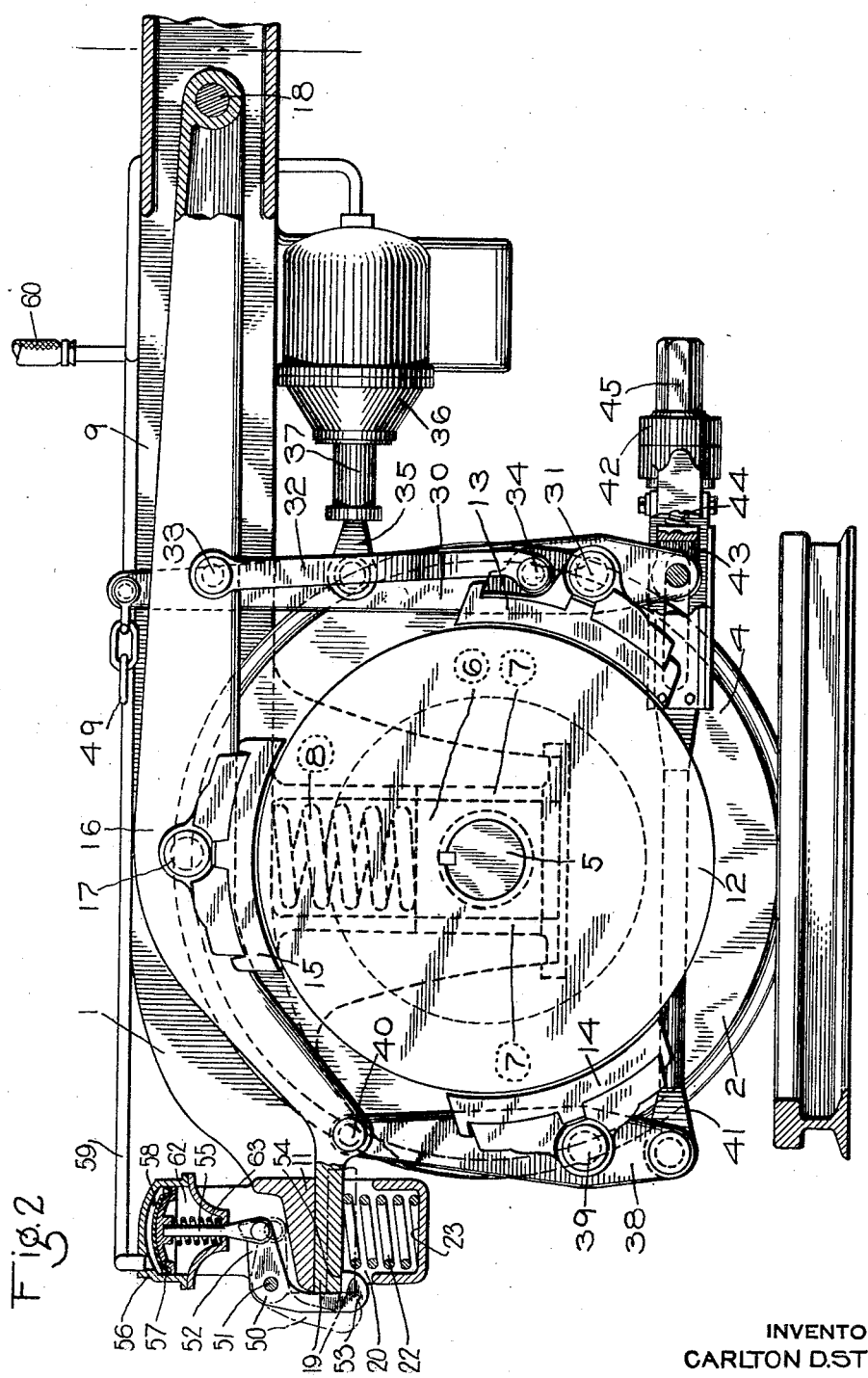
INVENTOR
CARLTON D. STEWART
BY
ATTORNEY Oct. 31, 1939.  C. D. STEWART  2,177,960
BRAKE MECHANISM
Filed Dec. 28, 1938   3 Sheets-Sheet 3
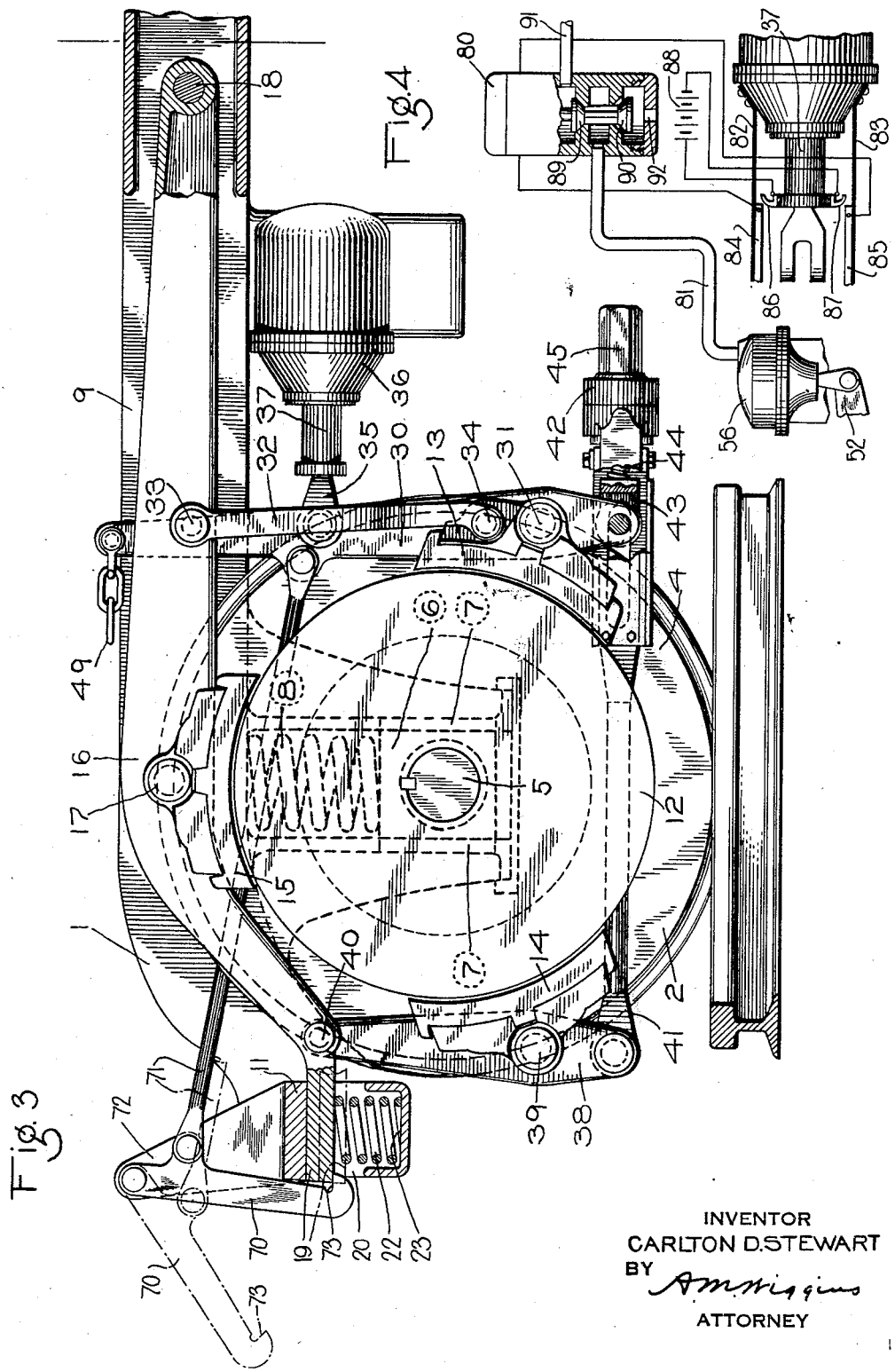
INVENTOR
CARLTON D. STEWART
BY A. M. Wiggins
ATTORNEY Patented Oct. 31, 1939

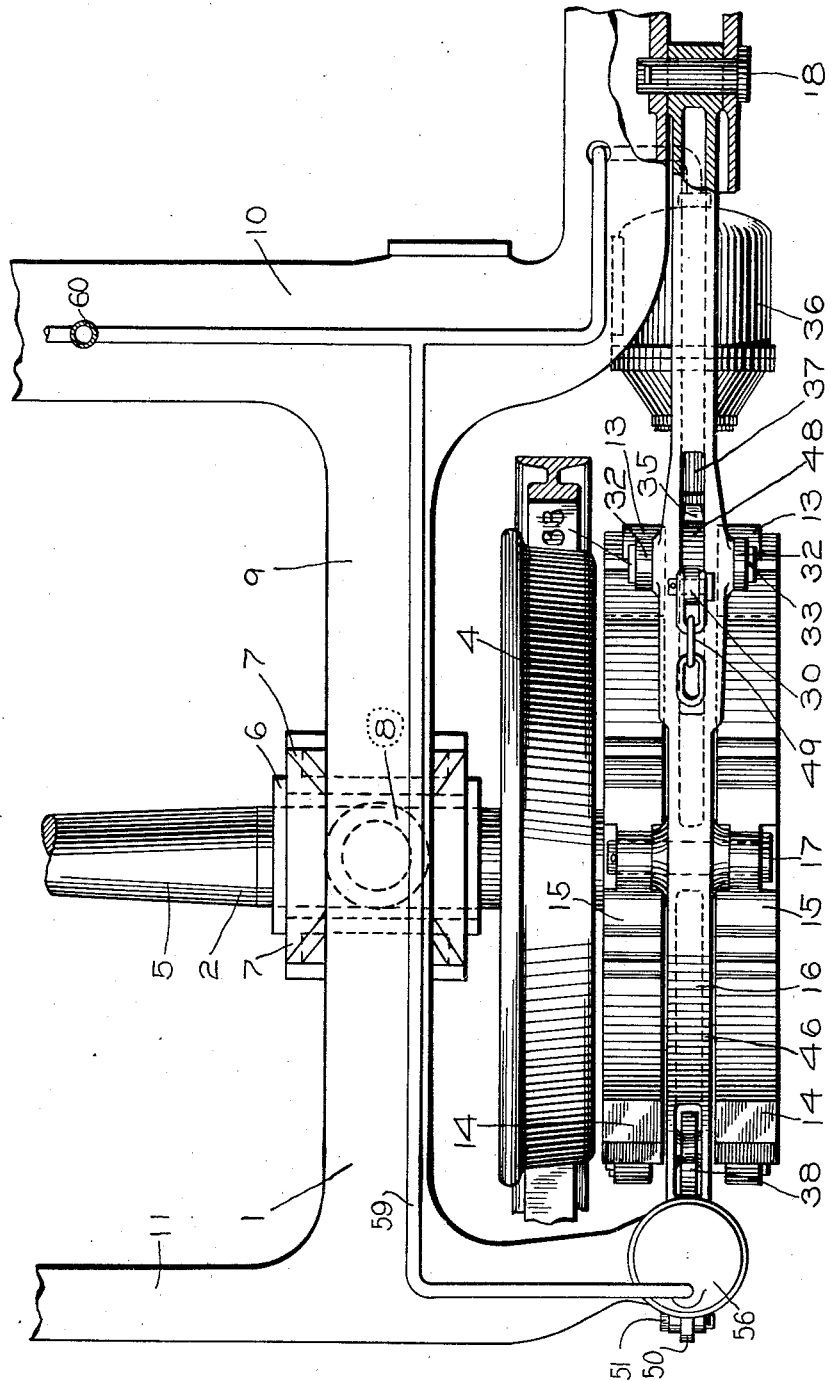

2,177,960

UNITED STATES PATENT OFFICE 2,177,960

BRAKE MECHANISM

Carlton D. Stewart, Wilkinsburg, Pa., assignor to The Westinghouse Air Brake Company, Wilmerding, Pa., a corporation of Pennsylvania Application December 28, 1938, Serial No. 248,079

20 Claims. (Cl. 188—58)

This invention relates to brake mechanisms for railway vehicle trucks and more particularly to that type of brake mechanism disclosed in my prior pending application for United States Letters Patent, Serial No. 214,517, filed June 18, 1938, in which, in effecting an application of the brakes, downwardly directed forces set up in the mechanism upon the frictional braking engagement of one or more brake shoes with a wheel and axle assembly of the truck will be transmitted, through the medium of another brake shoe, to the assembly instead of to the frame of the truck.

The brake mechanism disclosed in the above mentioned pending application is of the clasp type and comprises a single brake cylinder and a single system of operatively connected levers and rods for actuating clasp arranged brake shoes into and out of braking engagement with a wheel and axle assembly of the truck, and further comprises a brake carrier member which normally supports the system from the truck frame, and which is actuated by said system, when an application of the brakes is initiated, to move another brake shoe into engagement with the wheel and axle assembly to assist in opposing rotation of the assembly and to support the greater portion of the load imposed on the system by the clasp arranged brake shoes while such shoes are in frictional braking engagement with the wheel and axle assembly. Thus, the additional load due to braking is substantially wholly carried by the wheel and axle assembly instead of by the truck frame.

The brake carrier member is pivotally connected at one end to the truck frame and at the other end rests upon a release spring which is carried by the truck frame. Located above the release spring and interposed between and engaging the carrier member and a portion of the truck frame is a cushioning spring which, when the brake rigging is in release position, is adapted to cushion upward movement of this end of the member under the influence of service shocks to which a truck is subjected in train service, downward movement being cushioned by the release spring.

From this it will be seen that in train service the brake carrier member may be caused to vibrate vertically relative to the truck frame in response to the shocks to which the truck is subjected. This is objectionable in that it causes undue wear of the brake rigging parts and their connecting pins.

Upward movement of the carrier member beyond its normal brake release position under the influence of ordinary service shocks could be prevented by providing a heavier cushioning spring, but obviously this could not be done with the release spring without decreasing the effectiveness of the brake shoe which is operated by the carrier member.

The principal object of the present invention is to provide a brake mechanism of the above mentioned type with means for locking the brake carrier member rigidly to the truck frame while the brakes are released and for releasing the member when an application of the brakes is being initiated.

Another object of the invention is to provide a brake mechanism of the above type with means operative automatically in releasing an application of the brakes for maintaining the brake carrier member against vertical movement relative to the truck frame, and operative automatically for freeing the carrier member for movement relative to the truck frame.

Other objects and advantages will appear in the following more detailed description of the invention.

In the accompanying drawings Fig. 1 is a plan view of a portion of a railway vehicle truck and brake rigging embodying the invention; Fig. 2 is a side elevational view, partly in section, of the same; Fig. 3 is a view similar to Fig. 2 but illustrating a modification of the invention; and Fig. 4 is a fragmentary diagrammatic view of a further modification of the invention embodying electrical control means for the apparatus shown in Fig. 2.

For illustrative purposes the invention is shown embodied in a railway vehicle truck of the type having a cast metal truck frame 1 and two longitudinally spaced wheel and axle assemblies 2 and 3, each of which assemblies comprises laterally spaced wheels 4 which may be secured in any desired manner to the axle 5 so as to rotate therewith.

Between the wheels and at each side of the truck each axle is suitably journaled in a journal bearing 6, loosely mounted between spaced pedestal jaws 7 depending downwardly from the truck frame, and seated on the journal bearings and resiliently supporting the truck frame are springs 8.

The truck frame differs somewhat from the conventional type of frame in that the side frames 9 thereof are inset or recessed opposite each wheel to accommodate the wheel, and in that the pedestal jaws and journal bearings are disposed inboard of the wheels. The side frames 9 may be integrally connected together in the usual manner by transversely extending transoms 10 and transversely extending end pieces 11.

Located outboard of each wheel of each wheel and axle assembly but adjacent thereto are two spaced annular brake drums 12 which are preferably integral with each other and which are secured to the outer end of the axle so as to rotate therewith. Each of these brake drums is provided with an outer or peripheral braking surface which is adapted to be frictionally engaged by brake elements 13, 14 and 15 radially arranged about the drum, the elements 13 and 14 being located below the horizontal center line of the drum and at opposite sides thereof, and the element 15 being located above the drum on substantially the vertical center line thereof. It will here be understood that each brake element may comprise the usual brake shoe and brake shoe head and since this combination of head and shoe is well known the elements will, for simplification, be hereinafter referred to by the term brake shoe.

The brake shoes 15 are pivotally carried by a combined lever and brake rigging supporting member 16 which extends longitudinally of the truck on the outer side of the adjacent side frame 9 and above the brake drum, the brake shoes being arranged one on each side of the member and being operatively connected to the member by means of a transversely extending pin 17.

The inner end of the member 16 is pivotally connected to the adjacent truck frame 9 by means of a transversely extending pin 18. The outer end of the member is made in the form of a flat rectangular projection 19 which extends through an accommodating opening 20 formed in the adjacent end piece 11 of the truck frame, the side walls of the opening constituting vertical guides for the member. The lower side of the projection is seated on the upper end of a release spring 22 which is seated on the bottom wall of an accommodating pocket 23 which may be formed integral with the end piece of the truck frame.

The upper surface of the projection 19 is flat and with the brakes released as shown in full lines in the drawings this surface will be locked in close contact with a corresponding lower surface on the end piece 11 of the truck frame by means of a locking mechanism carried by the truck frame, which mechanism will be hereinafter fully described.

The brake shoes 13 at each end of each wheel and axle assembly are arranged one on each side of a vertically disposed brake cylinder lever 30 and are pivotally connected to such lever intermediate its ends by means of a transversely extending pin 31.

For supporting each lever 30 and the brake shoes operatively connected thereto, hangers 32 are provided which are arranged one on each side of the lever. Each hanger at its upper end is pivotally mounted on a horizontally disposed trunnion carried by and extending outwardly from one side of the member 16, which trunnion in the present embodiment of the invention, is in the form of a pin 33. The lower end of each hanger is operatively connected to one of the brake shoes 13 by means of a pin 34, which pin in the present embodiment of the invention is located at a point slightly above the pin 31. It will here be noted that the hangers support the brake cylinder lever through the medium of the brake shoes 13.

Above the pins 31 and 34 each lever 30 is operatively connected to the outer end of the push rod 35 of a brake cylinder device 36 which may be of the conventional type having a cylinder casing in which there is operatively mounted a piston having a hollow piston rod 37 in which the push rod is operatively mounted, which piston is responsive to the pressure of fluid supplied to the cylinder portion to actuate the lever to effect an application of the brakes, and which operates upon the venting of fluid from the cylinder portion to permit the lever to assume its normal release position under the influence of the force of gravity as is usual. Since such brake cylinder devices are so well known a detailed showing of all of the parts thereof is deemed unnecessary.

The brake shoes 14 at each end of each wheel and axle assembly are arranged one on each side of a vertically disposed hanger lever 38 and are pivotally connected to the lever by means of a transversely extending pin 49. The upper end of this lever is pivotally connected to the outer end portion of the member 16 by means of a pin 40.

The lower ends of the brake cylinder lever and the hanger lever are operatively connected together by means of a longitudinally extending connector which, in the present embodiment of the invention, may comprise a rod 41 which is operatively connected at one end to the hanger lever 38 and at its other end is operatively connected to the brake cylinder lever 30 through the medium of a slack adjuster 42 carried by the rod 41.

The slack adjuster 42 may be of any conventional type having a movable cross head 43 which is operatively connected to the lower end of the brake cylinder lever and which may be actuated by a screw mechanism 44 adapted to be manually operated through the medium of an adjusting nut 45.

As shown in Fig. 1, and as hereinbefore mentioned the brake drums 12 are made integral with each other and the braking surfaces thereof are separated in a direction longitudinally of the axle by a circular groove 46 which is of sufficient width and depth to accommodate the connector 41 which extends into the plane of the drum.

The upper end portion of each brake cylinder lever 30 extends through a vertically extending opening 48 formed in the adjacent member 16, and above the member has a hand brake pull rod or chain 49 operatively connected thereto, which pull rod or chain is adapted to be actuated through the medium of the usually operable brake mast. It may be that adequate manual braking of the vehicle may be accomplished through the medium of one wheel and axle assembly of the truck and when this is the case, the hand brake connections to the brake cylinder levers of the brake rigging for the wheel and axle assembly which is located farthest away from the end of the vehicle may be omitted and the levers 30 made shorter.

With the brake cylinder devices 36 devoid of fluid under pressure each brake rigging will be in release position as shown in Figs. 1 to 3, inclusive and will be maintained in this position by the force of gravity or by a release spring when such a spring is employed.

The locking mechanism shown in Figs. 1 and 2 for locking the brake carrying member 16 against vertical movement relative to the truck frame when the brakes are released and for releasing the member when an application of the brakes is initiated comprises a locking latch 50 which is pivotally connected above the projection 19 to the end piece 11 of the truck frame by means of a pin 51.

This locking latch is in the form of a bell crank having a locking arm 52 and an actuating arm 53. The arm 52 extends downwardly over the outer edge of the end piece 11 and at its lower end is provided with a supporting or locking ledge 54 upon which as shown in full lines in Fig. 2 the brake carrier member 16 rests when the member is in its brake release position. The arm 53 extends inwardly in the direction of the width of the end piece 11 and, at its end, is operatively connected to the piston rod 55 of a fluid pressure controlled actuating motor 56 rigidly carried by the truck frame, the piston rod being operable by a piston 57 which is operatively mounted in the casing of the motor.

At one side of the piston 57 is a pressure chamber 58 which is connected to a pipe 59 through which fluid under pressure is supplied to and released from the brake cylinder, which pipe is carried by the truck frame and which may be connected by means of a flexible hose 60 to a corresponding supply and release pipe which may be carried by the body of the vehicle, not shown. At the other side of the piston is a non-pressure chamber 62 which is in constant communication with the atmosphere by way of clearance space between the piston rod and the motor casing.

Contained in this chamber 62 and interposed between and operatively engaging the piston and the casing is a light spring 63 which, as will hereinafter more fully appear, is adapted to actuate the locking latch to its locking position when, in releasing the brakes, the pressure of fluid in the pressure chamber 58 has been reduced almost to atmospheric pressure and to actuate the latch to its unlocking position before the brake cylinder actuates the clasp arranged brake shoes into engagement with the brake drums 12.

Application of the brakes

When it is desired to effect an application of the brakes fluid under pressure is supplied through flexible hose 60 and pipe 59 to the pressure chamber 58 of each latch actuating motor 56 and to the piston chamber of each brake cylinder causing the latch actuating piston 57 to operate to actuate the locking latch out of locking engagement with the brake carrier member 16 as shown in dot and dash lines in Fig. 2, and also causing the brake cylinder piston to function to actuate the brake cylinder lever 30 associated therewith and thereby the hanger lever 38 to cause the brake shoes 13 and 14 to frictionally engage the peripheral braking surfaces of the brake drums 12.

It is to be understood that the spring 63 is of such a low value that it will offer but slight opposition to the unlocking movement of the piston 57, so that before the pressure in the brake cylinder piston chamber has been increased sufficiently to cause the brake cylinder to operate to bring the brake shoes 13 and 14 into braking engagement with the brake drums, the piston 57 will function to move the locking latch 50 out of locking position with relation to the brake carrier member 16.

With the locking latch in its unlocking position the release spring 22 maintains the brake carrier member 16 and the brake rigging parts carried thereby in their normal positions vertically of the truck until such time as the brake shoes 13 and 14 engage with the brake drums.

With the brake shoes 13 and 14 in engagement with the drums, the increasing brake cylinder force being applied to the brake shoes causes the shoes to move downwardly along the peripheral surfaces of the drums, the downwardly directed force, due to such action, being transmitted through the brake cylinder lever 30, the hangers 32 and the hanger lever 38 to the member 16, causing the member to rock downwardly about the pin 18 and against the opposing action of the release spring 22 until such time as the brake shoes 15 engage the drums. At this time the downward movement of the member 16 and brake rigging parts carried thereby will cease since the member will now be rigidly supported by both the truck frame and the brake drums, the greater portion of the weight being carried by the drums. It will be understood that with the brake rigging in application position the brake shoes 15, besides serving to assist in supporting the member 16 and thereby the brake rigging, also act to resist rotary motion of the brake drums, thus materially increasing the braking action on a wheel and axle assembly for any given brake applying force applied to the rigging.

The pressure of fluid in the pressure chamber 58 of the latch operating motor will be at brake cylinder pressure so that the latch actuating piston 57 will maintain the locking latch 50 in its unlocking position, the latch remaining in this position until the brakes are released as will appear in the following description of the release operation.

Release of the brakes

When it is desired to effect the release of the brakes fluid under pressure is vented through pipe 59 and flexible hose 60 from the pressure chamber 58 of each latch actuating motor 56 and from the piston chamber of each brake cylinder. When fluid under pressure is thus vented from the brake cylinder, the usual release spring, not shown, of the brake cylinder causes the brake cylinder piston and hollow piston rod to move inwardly to their normal release position. At the same time the force of gravity causes the brake shoes 13 and 14 and the several parts of the brake rigging associated therewith to assume their normal release position as shown in Fig. 1 and Fig. 2. As these brake shoes 13 and 14 move out of contact with the brake drums the release spring 22 acts to rock the outer end of the brake carrier member 16 upwardly about the pin 18 until the projection 19 thereof engages the end piece 11 of the truck frame, the member being brought to a stop by reason of such engagement. The member as it is thus moved raises the brake shoes 15 out of engagement with the brake drums 12.

After the brake shoes 13, 14 and 15 have been moved out of engagement with the brake drums as just described the brake cylinder pressure and consequently the pressure of fluid in the pressure chamber 58 of the motor 56 will reduce to atmospheric pressure. Just slightly before the pressure in chamber 58 has reduced to atmospheric pressure, the light spring 63 acts to move the piston 57 and thereby the piston rod 55 to their uppermost or normal release position, the piston rod actuating the locking latch 50 into locking engagement with the projection 19 of the member 16. Thus the member 16 is rigidly locked against vertical movement relative to the truck frame.

Description of the locking mechanism shown in Fig. 3

The locking mechanism shown in Fig. 3 for locking the brake carrying member 16 rigidly to the truck frame when the brakes are released and for releasing or unlocking the member when an application of the brakes is being initiated, differs from the corresponding mechanism shown in Figs. 1 and 2 in that the locking latch, which in this form of the invention is indicated by the reference character 70, is actuated mechanically from the brake cylinder lever 30 through the medium of a longitudinally extending rod 71. This rod passes through the space between the drums 12 and at one end is pivotally connected to the lever 30 at a point located adjacent the connection between the push rod 35 and the lever. At its other end this rod is operatively connected to the locking latch 70 at a point intermediate the ends of the latch.

The locking latch 70 is pivotally connected at its upper end to spaced lugs 72 which, in the present embodiment of the invention extend upwardly from and are integral with the end piece 11 of the truck frame. The lower end of the latch is provided with a supporting or locking ledge 73 which corresponds with the locking ledge 54 of the locking latch shown in Fig. 2. This ledge, like the ledge 54, is adapted to cooperate with the projection 19 of the brake carrier member 16 to lock the member against vertical movement relative to the truck frame.

When the several parts of the brake rigging are in their brake released position the locking latch 70 will be in its normal position as shown in Fig. 3, in which position it locks the brake carrier member 16 against vertical movement relative to the truck frame.

When, in effecting an application of the brakes fluid under pressure is supplied to the brake cylinder, the brake cylinder operates to move the brake cylinder lever in a direction toward the left hand, the lever causes the rod 71 to move in the same direction thereby rocking the locking latch 70 out of locking relationship with the brake carrier member 16 as shown in dot and dash lines in Fig. 3. It should here be mentioned that before the lever 30 has been moved far enough to cause the clasp arranged brake shoes to contact the brake drums the locking latch will have been moved out from under the projection 19, so that when the brake shoes 13 and 14 do contact the brake drums the brake carrier member is free to move downwardly to cause the brake shoes 15 to engage the brake drums.

It will be understood that after the brake carrier member is unlocked the brake mechanism will function to effect an application of the brakes in the same manner as described in connection with the mechanism shown in Figs. 1 and 2.

In releasing the brakes it is obvious that after the brake shoes 13 and 14 are moved out of engagement with the brake drums and the member 16 and brake shoe 15 have been moved upwardly to their normal position under the influence of the release spring 22, the final release movement of the brake cylinder lever 30 will cause the locking latch 70 to move into locking engagement with the projection 19 and thereby again lock the member 16 rigidly to the truck frame.

*Description of the apparatus shown in Fig. 4*

In Fig. 4 there is illustrated an electrical control apparatus which is adapted to be employed in connection with the locking mechanism shown in Fig. 1 and Fig. 2 in lieu of the direct fluid pressure control from the brake cylinder application and release pipe 59. When the electrical control apparatus is used there will be no fluid pressure communication from the pipe 59 to the pressure chamber 58 and this chamber will be connected to a magnet valve device 80 through a pipe 81, which valve device is operative to control the supply of fluid under pressure to and the release of fluid under pressure from the chamber entirely independently of the pipe 59.

The magnet valve device 80 may be of the usual type comprising a casing containing a magnet winding having a pair of terminals which are connected by wires to spaced switch contact members 84 and 85 which as shown in Fig. 4 may be carried by spaced brackets 82 and 83, respectively, rigidly secured to the brake cylinder. These contact members are adapted to be engaged by corresponding spaced switch contact points 86 and 87, respectively, which are secured to the hollow brake cylinder piston rod 37 for movement therewith. These contact points are connected by wires to the positive and negative terminals, respectively, of a suitable source of electrical energy such as a battery 88.

The magnet valve device also comprises operatively connected oppositely seating valves 89 and 90 which are mounted in the casing and which are adapted to be controlled by the action of the magnet winding upon energization or deenergization of the winding the valve 89 being a supply valve and the valve 90 an exhaust valve. The supply valve 89 is contained in a chamber which is in constant open communication with a pipe 91 which leads to a normally charged fluid pressure supply source such as a reservoir. The exhaust valve 90 is contained in a chamber which is in constant open communication with the atmosphere through a port 92.

With the magnet winding deenergized the supply valve 89 will be seated so that fluid under pressure cannot flow from the fluid pressure supply source to the pipe 81. With the valve 89 seated the exhaust valve 90 will be unseated and thereby connect the pipe 81 and consequently the pressure chamber 58 of the fluid pressure controlled motor 53 to the atmosphere.

With the brake cylinder piston rod in its release position as shown the switch contact points carried thereby will be out of engagement with the contact members carried by the truck frame, so that, with the brakes released, the magnet winding will be deenergized.

When fluid under pressure is admitted to the brake cylinder in initiating an application of the brakes, the brake cylinder functions to actuate the brake cylinder lever 30 and thereby the associated parts of the brake rigging to cause the clasp arranged brake shoes 13 and 14 to engage the brake drums, but before such engagement occurs the switch points carried by the piston rod engage the contact members carried by the truck frame and close the electric current through the magnet winding and battery 88 causing the energization of the winding and thereby the seating of the exhaust valve 90 and the unseating of the supply valve 89.

With the exhaust valve seated communication from the pipe 81 and consequently from the pressure chamber 58 to the atmosphere is closed and with the supply valve unseated fluid under pressure flows from the fluid pressure supply source past the supply valve to the pipe 81 and therethrough to the pressure chamber 58 causing the piston 57 to move downwardly against the opposing action of the spring 63, the piston acting through the medium of the piston rod 55 to actuate the locking latch 50 to its unlocking position.

It will be noted that before the brake shoes 13 and 14 are in engagement with the drum the latch 50 will be moved out of locking engagement with the brake carrier member 16, so that when these brake shoes engage the drums the member will be caused to move downwardly and thereby move the brake shoe 15 into engagement with the drums. The circuit through the winding will remain closed so long as the brake cylinder piston rod remains in brake application position and as a consequence the locking latch 50 will remain in its unlocking position until such time as the brakes are released and the brake cylinder piston rod is moved to its normal release.

Just prior to the brake cylinder piston rod reaching its normal release position the circuit through the magnet winding will be opened causing the deenergization of the winding whereupon the supply and exhaust valves 89 and 90, respectively, will, by the force of gravity assume their normal release positions in which the supply valve is seated cutting off communication from the fluid pressure supply source to the pressure chamber 58 of the latch actuating motor 56, and in which the exhaust valve 89 is unseated permitting fluid under pressure to flow rapidly from the chamber 58 to the atmosphere.

Upon the venting of fluid under pressure from the chamber 58, the spring 63 which has been compressed, acts to move the piston 57 and the piston rod 55 upwardly to its normal position thereby operating the locking latch into locking relationship with the member 16, which member has been previously moved to its normal release position by the action of the release spring 22.

General considerations

From the foregoing description it will be seen that with each form of the invention the brake carrier member 16 will be locked rigidly to the truck frame against vertical movement relative to the frame while the brakes are released and will be unlocked when an application of the brakes is initiated and during the brake application, and that the automatic unlocking and locking of the member 16 is effected prior to the actual application of the brakes or the release of thereof as the case may be.

While several illustrative embodiments of the invention have been described in detail, it is not my intention to limit its scope to these embodiments or otherwise than by the terms of the appended claims.

Having now described the invention, what I claim as new and desire to secure by Letters Patent, is:

1. In a brake mechanism for a wheel and axle assembly of a railway vehicle truck having a truck frame supported on the assembly, in combination, friction braking means movable into braking engagement with said assembly, another friction braking means movable relative to the truck frame by the first mentioned friction braking means into braking engagement with said assembly, and means normally holding said other friction braking means against movement relative to the truck frame and being automatically operated out of holding relationship with said other friction braking means prior to the movement of the first mentioned friction braking means into braking engagement with the assembly.

2. In a brake mechanism for a wheel and axle assembly of a railway vehicle truck having a truck frame supported on the assembly, in combination, friction braking means movable into braking engagement with said assembly another friction braking means movable relative to the truck frame by the first mentioned friction braking means into braking engagement with said assembly, and means normally holding said other friction braking means against movement relative to the truck frame and being automatically operated out of holding relationship with said other friction braking means prior to the movement of the first mentioned friction braking means into braking engagement with the assembly, and being automatically operated to its holding position upon movement of all of the braking means out of engagement with the assembly.

3. In a brake mechanism for a wheel and axle assembly of a railway vehicle truck having a truck frame supported on the assembly, in combination, clasp arranged brake elements movable into braking engagement with said assembly, mechanism operative to actuate said brake elements, another brake element movable relative to the truck frame by said clasp arranged brake elements into engagement with said assembly, and means normally holding said other brake element against movement relative to the truck frame and being automatically operative out of holding relationship with the brake element before the clasp arranged brake elements act to move the brake element.

4. In a brake mechanism for a wheel and axle assembly of a railway vehicle truck having a truck frame supported on the assembly, in combination, clasp arranged brake elements movable into braking engagement with said assembly, mechanism operative to actuate said brake elements, another brake element movable relative to the truck frame by said clasp arranged brake elements into engagement with said assembly, and means normally holding said other brake element against movement relative to the truck frame and being automatically operative out of holding relationship with the brake element before the clasp arranged brake elements act to move the brake element, said means being automatically returned to its normal holding position after the clasp arranged brake elements are moved out of engagement with the assembly in effecting the subsequent release of the brakes.

5. In a brake mechanism for a wheel and axle assembly of a railway vehicle truck having a truck frame supported on the assembly, in combination, clasp arranged brake elements movable into braking engagement with said assembly, mechanism operative to actuate said brake elements, another brake element movable relative to the truck frame by said clasp arranged brake elements into engagement with said assembly, a locking latch movably carried by said truck frame adapted to normally lock said other brake element rigidly to the truck frame and being movable out of locking relationship with said other brake element, and means operative in initiating the operation of said clasp arranged brake elements for engagement with the assembly to actuate the locking means out of locking relationship with said other brake element.

6. In a brake mechanism for a wheel and axle assembly of a railway vehicle truck having a truck frame supported on the assembly, in combination, clasp arranged brake elements movable into braking engagement with said assembly, mechanism operative to actuate said brake elements, another brake element movable relative to the truck frame by said clasp arranged brake elements into engagement with said assembly, a locking latch movably carried by said truck frame adapted to normally lock said other brake element rigidly to the truck frame and being movable out of locking relationship with said other brake element, and means operative upon the initial movement of the clasp arranged brake elements toward braking engagement with the assembly for moving the locking means out of locking relationship with said other brake element.

7. In a brake mechanism for a wheel and axle assembly of a railway vehicle truck having a truck frame supported by the assembly, in combination, clasp arranged brake elements movable into braking engagement with said wheel and axle assembly, mechanism operative to actuate said brake elements, another brake element movable relative to the truck frame into engagement with said wheel and axle assembly by said clasp arranged brake elements when the clasp arranged brake elements are moved into braking engagement with the assembly, and means normally locking said other brake element against movement relative to the truck frame and automatically operative prior to the braking engagement of said clasp arranged brake elements with the wheel and axle assembly for unlocking said other brake element.

8. In a brake mechanism for a wheel and axle assembly of a railway vehicle truck having a truck frame supported by the assembly, in combination, clasp arranged brake elements movable into braking engagement with said wheel and axle assembly, mechanism operative to actuate said brake elements, another brake element movable relative to the truck frame into engagement with said wheel and axle assembly by said clasp arranged brake elements when the clasp arranged brake elements are moved into braking engagement with the assembly, and means normally locking said other brake element against movement relative to the truck frame and automatically operative by said mechanism upon the initial movement of the mechanism in operating the clasp arranged brake elements into braking engagement with the assembly.

9. In a brake mechanism for a wheel and axle assembly of a railway vehicle truck having a truck frame supported by the assembly, in combination, clasp arranged brake elements movable into braking engagement with said wheel and axle assembly, mechanism operative to actuate said brake elements, said mechanism comprising a plurality of operatively connected brake levers, another brake element movable relative to the truck frame into engagement with said wheel and axle assembly by said clasp arranged brake elements when the clasp arranged brake elements are moved into braking engagement with the assembly, and means normally locking said other brake element against movement relative to the truck frame and automatically operative by one of said levers upon the initial movement of the lever in the direction to actuate the clasp arranged brake elements into braking engagement with the assembly for unlocking said other brake element.

10. In a brake mechanism for a wheel and axle assembly of a railway vehicle truck having a truck frame supported by the assembly, in combination, clasp arranged brake elements movable into braking engagement with said wheel and axle assembly, mechanism operative to actuate said brake elements, said mechanism comprising a hanger lever and a brake cylinder lever operatively connected together, a brake cylinder operative by fluid under pressure to actuate said brake cylinder lever, another brake element movable relative to the truck frame into engagement with said wheel and axle assembly by said clasp arranged brake elements when the clasp arranged brake elements are moved into braking engagement with the assembly, and means normally locking said other brake element against movement relative to the truck frame and automatically operative by said brake cylinder lever upon the initial movement of the brake cylinder lever in the direction to actuate the clasp arranged brake elements into braking engagement with the assembly for unlocking said other brake element.

11. In a brake mechanism for a wheel and axle assembly of a railway vehicle truck having a truck frame supported by the assembly, in combination, clasp arranged brake elements movable into braking engagement with said wheel and axle assembly, mechanism operative by fluid under pressure to actuate said brake elements, another brake element movable relative to the truck frame into engagement with said wheel and axle assembly by said clasp arranged brake elements when the clasp arranged brake elements are moved into braking engagement with the assembly, means normally locking said other brake element against movement relative to the truck frame, and fluid pressure responsive means operative by fluid under pressure being supplied to said mechanism for actuating the locking means out of locking relationship with said other brake element.

12. In a brake mechanism for a wheel and axle assembly of a railway vehicle truck having a truck frame supported by the assembly, in combination, braking means movable into braking engagement with said assembly, means movably connected to said truck frame adapted to support said braking means and being movable relative to the truck frame into braking engagement with said assembly under the influence of forces set up by the engagement of said braking means with the assembly, locking means cooperating with said truck frame and the supporting means for normally locking the supporting means against movement relative to the truck frame, and means for actuating said locking means out of locking relationship with said supporting means upon the operation of the braking means for engagement with the assembly.

13. In a brake mechanism for a wheel and axle assembly of a railway vehicle truck having a truck frame supported by the assembly, in combination, braking means movable into braking engagement with said assembly, means movably connected to said truck frame adapted to support said braking means and being movable relative to the truck frame into braking engagement with said assembly under the influence of forces set up by the engagement of said braking means with the assembly, means carried by said truck frame and cooperating with the means movably connected to the truck frame for moving the means out of engagement with the assembly in releasing the brakes, and a latch movable into engagement with the means carried by the truck frame when the means has been moved out of engagement with the assembly in releasing the brakes and movable out of engagement with the means prior to the movement of the braking means into engagement with the assembly in effecting an application of the brakes, and means for automatically controlling the operation of said latch.

14. In a brake mechanism for a wheel and axle assembly of a railway vehicle truck having a truck frame supported by the assembly, in combination, braking means movable into braking engagement with said assembly, said braking means comprising a plurality of brake shoes arranged radially about said assembly and movable into and out of braking engagement with the assembly, a system of operatively connected levers for actuating certain of said shoes, means carried by said truck frame for supporting said levers and actuable by said system to move another of said shoes relative to the truck frame into braking engagement with said assembly upon movement of said certain brake shoes into braking engagement with the assembly, a latch normally locking said means and thereby said other brake shoe against movement relative to the truck frame, said latch being movable out of locking engagement with said means in initiating an application of the brakes and being movable into locking engagement with said means upon the subsequent release of the brakes, and means for controlling the operation of said latch.

15. In a brake mechanism for a wheel and axle assembly of a railway vehicle truck having a truck frame supported by the assembly, in combination, braking means movable into braking engagement with said assembly, said braking means comprising a plurality of brake shoes arranged radially about said assembly and movable into and out of braking engagement with the assembly, a system of operatively connected levers for actuating certain of said shoes, means carried by said truck frame for supporting said levers and actuable by said system to move another of said shoes relative to the truck frame into braking engagement with said assembly upon movement of said certain brake shoes into braking engagement with the assembly, a latch normally locking said means and thereby said other brake shoe against movement relative to the truck frame, said latch being operable by one of said levers out of locking engagement with said means when the lever is moved to effect the movement of said certain brake shoes in the direction to engage the assembly and operable by said lever into locking engagement with said means as the lever, in its movement in the direction to effect the movement of said certain brake shoes out of engagement with the assembly, reaches its normal release position.

16. In a brake mechanism for a wheel and axle assembly of a railway vehicle truck having a truck frame supported by the assembly, in combination, a brake mechanism for said wheel and axle assembly, means normally supporting said mechanism from said truck frame and being operable relative to the truck frame by said mechanism in effecting an application of the brakes into supporting engagement with said wheel and axle assembly for limiting downward movement of the brake mechanism relative to the assembly, means normally locking the brake supporting means against movement relative to the truck frame and automatically operative out of locking relationship with the brake supporting means upon the initiation of an application of the brakes.

17. The combination, with a railway vehicle truck comprising a supporting wheel and axle assembly and a part movable vertically relative to the assembly, of a friction braking element movable into braking engagement with said assembly, means for actuating said element, a member supporting said means and pivotally connected to said movable part for vertical movement relative to the part into engagement with said assembly in response to the force set up by the engagement of said braking element with the assembly, a latch normally locking said member rigidly to the truck frame and operative out of locking relationship with said member when an application of the brakes is initiated and into locking relationship with the member when a subsequent release of the brakes is effected, and means for effecting the operation of said latch.

18. The combination, with a railway vehicle truck comprising a supporting wheel and axle assembly and a part movable vertically relative to the assembly, of a friction braking element movable into braking engagement with said assembly, means for actuating said element, a member supporting said means and pivotally connected to said movable part for vertical movement relative to the part into engagement with said assembly in response to the force set up by the engagement of said braking element with the assembly, a latch normally locking said member rigidly to the truck frame and operative out of locking relationship with said member when an application of the brakes is initiated and into locking relationship with the member when a subsequent release of the brakes is effected, and fluid pressure responsive means for effecting the operation of said latch.

19. The combination with a railway vehicle truck comprising a supporting wheel and axle assembly and a part movable vertically relative to the assembly, of a friction braking element movable into braking engagement with said assembly, means for actuating said element, a member supporting said means and pivotally connected to said movable part for vertical movement relative to the part into engagement with said assembly in response to the force set up by the engagement of said braking element with the assembly, a latch normally locking said member rigidly to the truck frame and operative out of locking relationship with said member when an application of the brakes is initiated and into locking relationship with the member when a subsequent release of the brakes is effected, and electrically controlled means for effecting the operation of said latch.

20. The combination with a railway vehicle truck comprising a supporting wheel and axle assembly and a part movable vertically relative to the assembly, of a friction braking element movable into braking engagement with said assembly, means for actuating said element, a member supporting said means and pivotally connected to said movable part for vertical movement relative to the part into engagement with said assembly in response to the force set up by the engagement of said braking element with the assembly, a latch normally locking said member rigidly to the truck frame and operative out of locking relationship with said member when an application of the brakes is initiated and into locking relationship with the member when a subsequent release of the brakes is effected, and means operable by the actuating means for said element for effecting the operation of said latch.

CARLTON D. STEWART.